United States Patent [19]

Olson et al.

[11] Patent Number: 4,521,647
[45] Date of Patent: Jun. 4, 1985

[54] TONE DETECTION SYSTEM AND METHOD

[75] Inventors: Peter D. Olson, Saratoga; Samuel R. Hawes, Jr., Palo Alto, both of Calif.

[73] Assignee: Octel Communications, Inc., San Jose, Calif.

[21] Appl. No.: 581,283

[22] Filed: Feb. 17, 1984

[51] Int. Cl.³ .......................................... H04M 11/00
[52] U.S. Cl. ............................. 179/84 VF; 179/6.11; 179/2 A
[58] Field of Search ............. 179/84 VF, 84 R, 81 R, 179/18 EB, 6.11, 2 A, 6.14, 2 DP

[56] References Cited

U.S. PATENT DOCUMENTS 3,715,518 2/1973 Campbell et al. ............... 179/84 VF
4,191,855 3/1980 Sakai ................................... 179/2 A

*Primary Examiner*—Gene Z. Rubinson
*Assistant Examiner*—James L. Dwyer
*Attorney, Agent, or Firm*—Flehr, Hohbach, Test, Albritton & Herbert

[57] ABSTRACT

Tone detection apparatus and a corresponding method is disclosed. The improved tone detector and method is for use in a preferred embodiment in a voice message answering system to provide for improved dual tone multi-frequency tone detection where an outgoing analog voice signal is connected to a telephone line. When an incoming call is detected, the tone detector looks at the incoming analog signal and if a dual tone control signal is detected, a filter is switched to filter the outgoing analog signal so that the DTMF tone signal now being detected is filtered out of the outgoing signal. If the incoming signal still detects a tone, the improved tone detector cuts off or disconnects the outgoing signal completely for approximately 20 milliseconds. If a dual tone control signal is still detected, it is determined that it is an incoming control signal and consequently access is required into the voice message system.

6 Claims, 7 Drawing Figures

FIG.—1

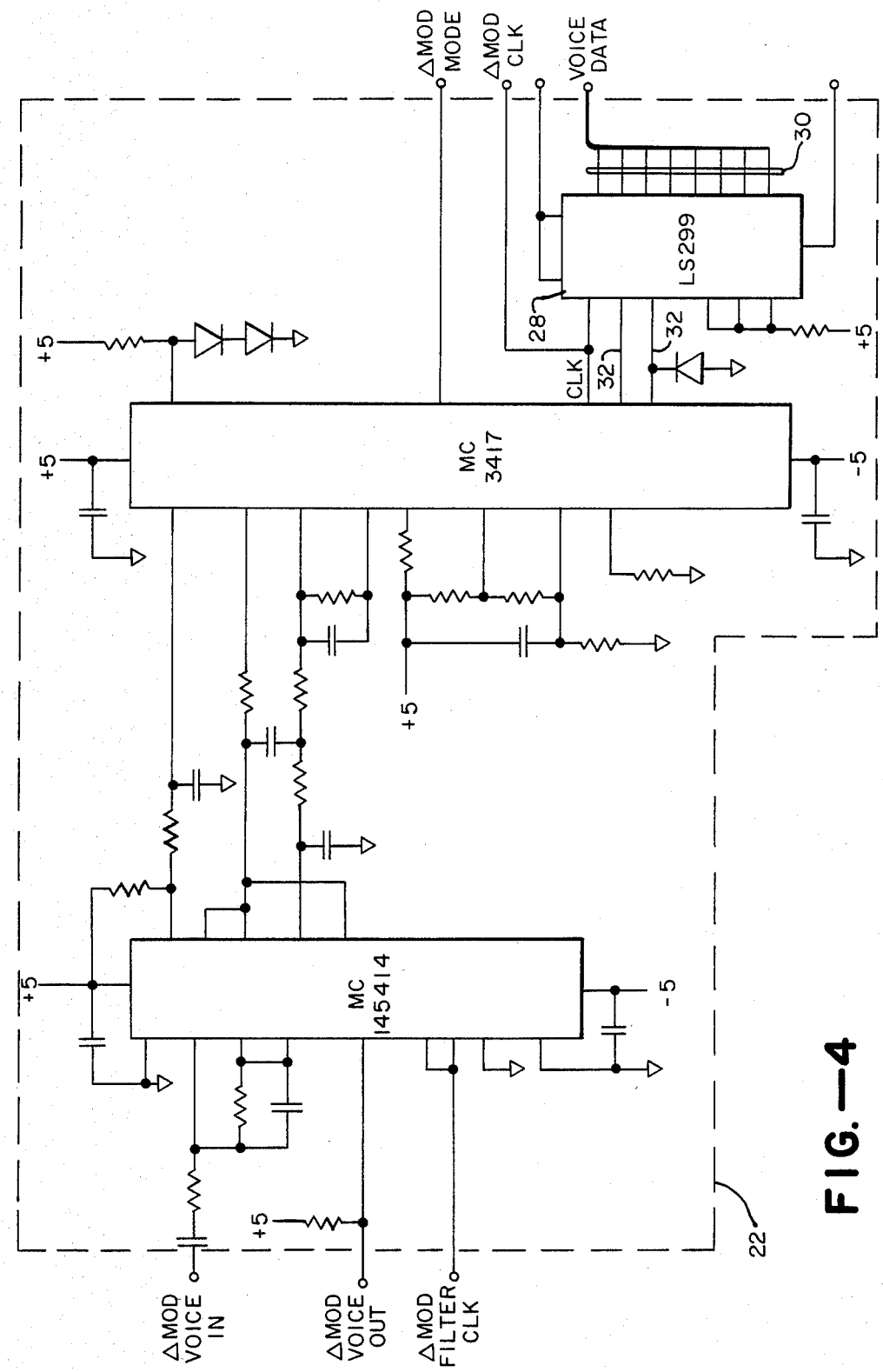
FIG.—4

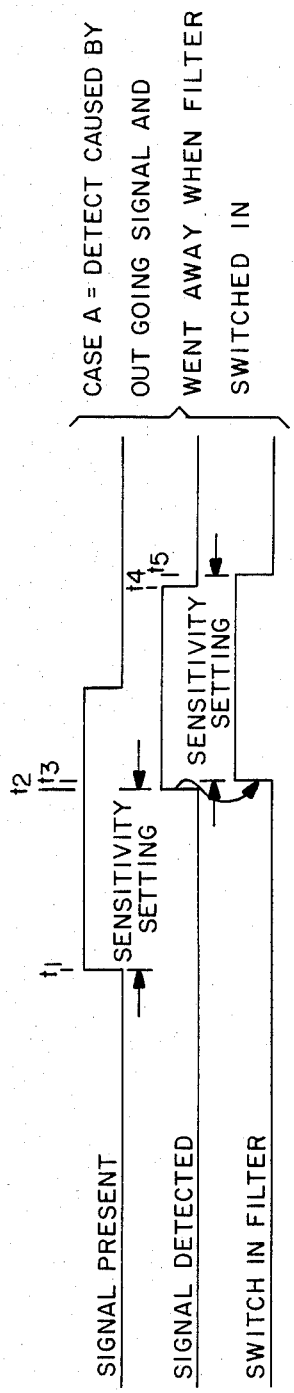
FIG.—5A
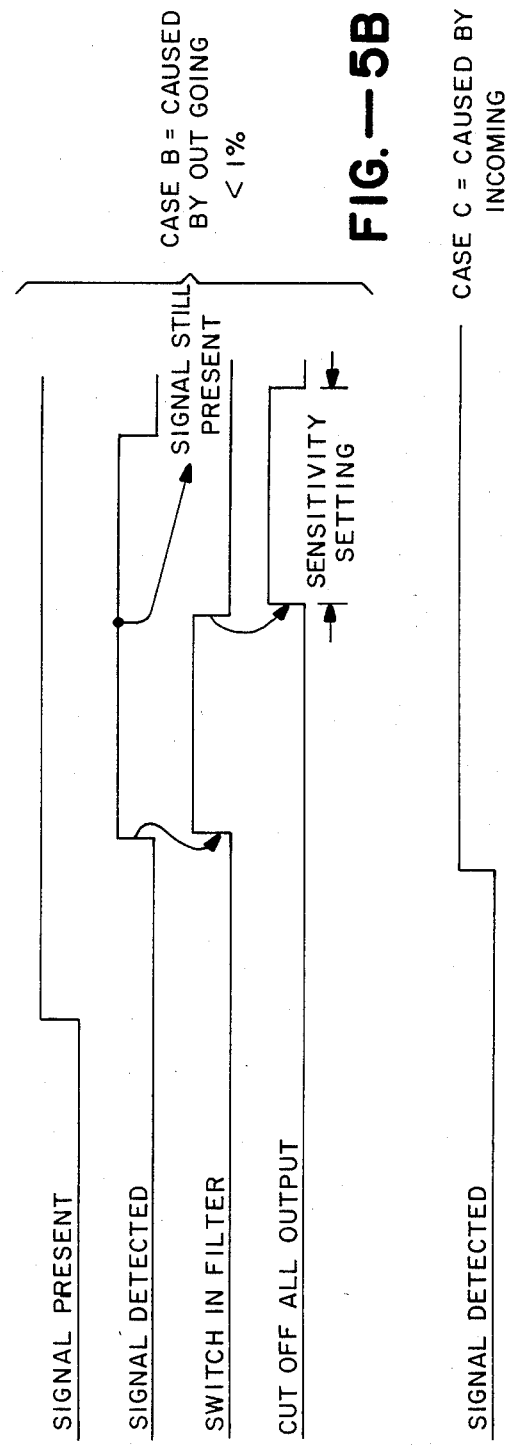
FIG.—5B
FIG.—5C

TONE DETECTION SYSTEM AND METHOD

BACKGROUND OF THE INVENTION

The present invention relates to an improved tone detection system and corresponding method. The present invention is more particularly directed toward incorporation with a voice message answering system.

In the prior art, the utilization of dual tone multi-frequency (DTMF) control signals is well known. In particular, a so-called touch tone pushbutton keyboard on a standard telephone is utilized to enable a user to establish communications by the appropriate depressing of the keys. The pressing of any key will enable a pair of DTMF control signals which represent audio frequencies that correspond to a particular number. In the United States, these "numbers" include 0-9, #, * and, in military applications, four other codes.

In applications such as for a voice message answering system, (DTMF) signals are utilized not only for establishing communications but in addition to provide control for appropriate message switching, message playback, and the like. They also are used to input certain data in reply to prompts or for other reasons.

In such an application, it is quite important that the DTMF tones be accurately detected in order to provide proper responses to the specified commands.

DTMF tone detection systems have typically been designed to operate with very low levels of noise on the line. However, voice store and forward systems require that the DTMF tones be detected while voice is playing over the line. For instance, if a user of such a voice store and forward system is "calling in" to his particular system, he may be listening to messages that have been recorded into the system and while at the same time he may decide to either speed up the playback of the messages, make them louder, or go on to other messages. This can result in the user inputting DTMF control signals into the system while at the same time voice message signals are being played out of the system onto a telephone line to the user's location.

A problem with such voice store and forward systems is that those systems require the DTMF tones be detected while voice is playing over the line. Conventional tone detection systems are not well suited for this. Given an amount of time, most voices will falsely trigger a DTMF tone detection system (called "talk-off"). Most tone detection systems can be desensitized to prevent such talk-off. However, this usually results in the DTMF tone detection system missing the detection of a significant percentage of tones even when they are present.

The resulting consequence of the foregoing is that the command or control signals can be misinterpreted or not recognized at all, which would result frequently in a specified command being ignored or misinterpreted entirely.

The deficiencies of prior art systems as set forth above are quite evident. It is therefore an objective of the present invention to provide an improved tone detection system and corresponding method for use in telephone systems and more particularly for use in voice message store and forward systems. However, the invention has application anywhere where tone detection must be optimized with high background noise.

SUMMARY OF THE INVENTION

The present invention provides a tone detection system and method which is engaged when voice messages are being played out to a listener and which is disengaged when messages are being recorded into the system.

In a preferred embodiment, the tone detect system first looks at an analog signal coming into the system via a standard telephone line. The dual tone multi-frequency (DTMF) detection apparatus is extremely sensitive so that it will trigger very easily for both voice and DTMF tones. The system will activate during playing of outgoing voice messages to the telephone line.

When an incoming analog signal containing voice which has the frequency of a DTMF signal and/or DTMF control signal is detected, tone detection apparatus filters the outgoing analog signal around one of the DTMF frequencies so that any DTMF tone frequencies being detected are filtered out of the outgoing signal. This filtering typically lasts approximately 20 milliseconds. The time is the same length of time the apparatus takes to detect the initial signal.

If the tone detection apparatus still detects a DTMF tone on the incoming signal, the system disconnects or cuts off the outgoing signal completely for about 20 milliseconds, so that a gap is formed. This "gap" is barely (or not) perceptible to the caller but provides enough total silence to the improved tone detector so that, if the original detection was a "talk-off", the detection will stop. If, however, the incoming signal was an externally originating DTMF tone, the improved detector will continue to be triggered.

In a typical application, the improved tone detection apparatus operates within 40 milliseconds, as contrasted with the typical telephone standard of 50 milliseconds as the fastest (shortest) DTMF signal permitted.

In accordance with the foregoing summary, the present invention achieves the general objective of providing an improved tone detection apparatus and method.

Other objects and features of the present invention will become apparent from the following detailed description when taken in conjunction with the accompanying drawings.

BRIEF DESCRIPTION OF THE DRAWINGS

FIG. 4 depicts a schematic diagram of a delta modulator/serdes circuit, which forms a portion of FIG. 1.

FIG. 5 consisting of FIGS. 5A–5C depicts a timing diagram for illustrating the operation of the improved tone detector of FIG. 1.

DETAILED DESCRIPTION OF THE PREFERRED EMBODIMENT

Figure 1:
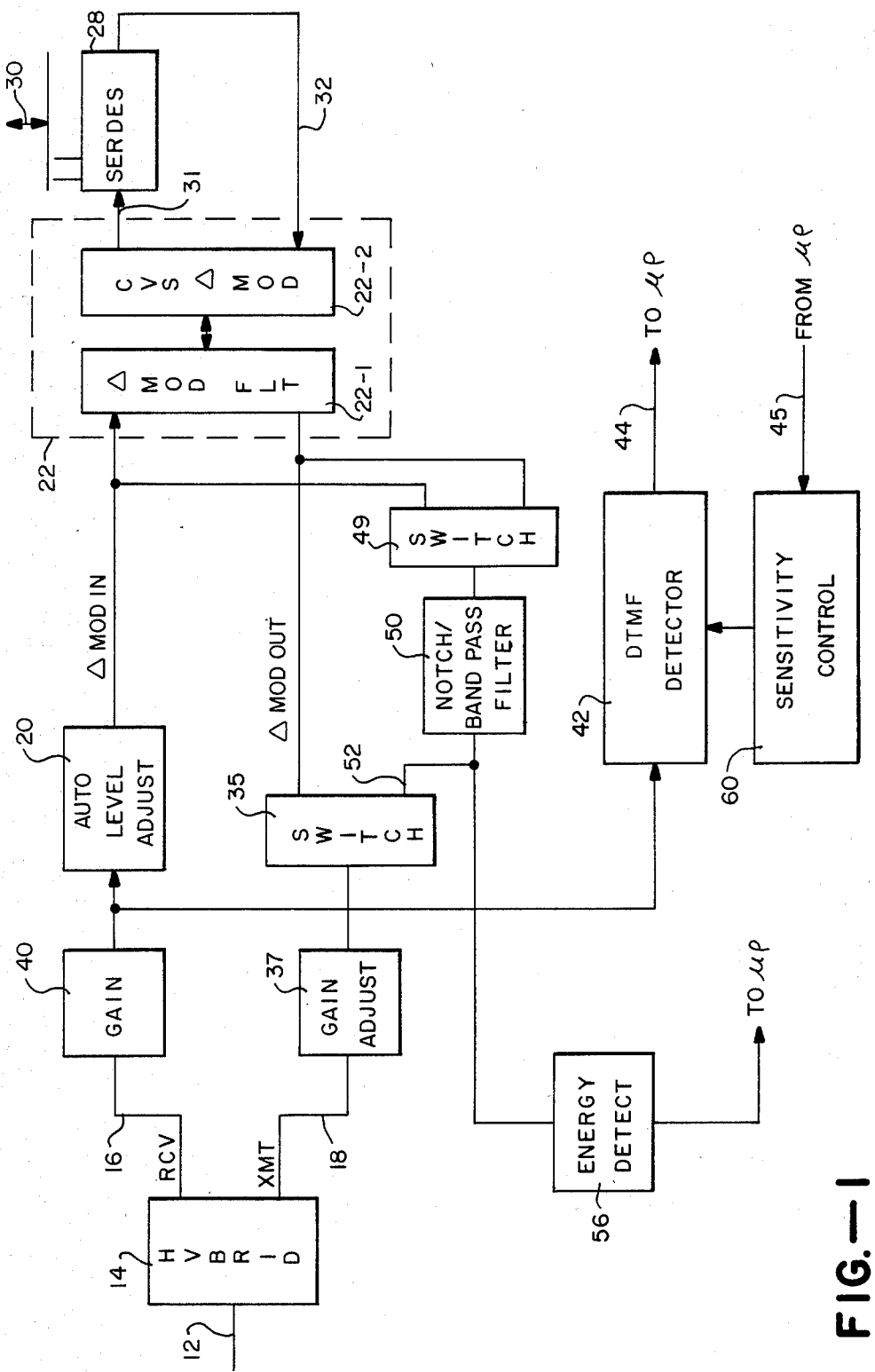
FIG. 1 depicts a block diagram of an improved tone detection system according to the present invention.

Before going into a detailed description of the drawings, a general overview of the present invention will now be described.

The invention operates on three cycles, all of which are the same length of time for detection.

(a) Detection of a DTMF tone. The detection is a result of either an incoming DTMF control signal or an outgoing voice pattern which contains a frequency pattern that falsely triggers the tone detect circuit.

(b) The DTMF signal contains two frequencies which are summed to generate the tone. The invention switches in a notch filter which takes out one of the frequencies from the outgoing voice signal. This is sufficient to stop detection if it is caused by a frequency pattern in the voice. The filter takes out a narrow band of frequencies ("notch") and thus requires knowledge of which tone has been detected. After switching in the filter, the system waits for the tone detection time period to see if the tone is still there.

(c) The third cycle is used as a final verification (insurance) that the signal is there only if the second cycle still detects tone. It comprises the cutting off all outgoing speech (or, alternatively, filtering all speech frequencies below the top DTMF frequency), waiting for the tone detection time period and verifying that the tone is still there. If it is, the system concludes that the tone is coming from an incoming signal and is a true DTMF tone.

The third cycle described above is not required for the invention to operate successfully. It is present as an extreme protection against false detection. In practice, an embodiment using just the first two cycles has been used experimentally for more than six months with no reports of false detection.

The time for each cycle is the same and can be adjusted from 15 to 25 ms. In general, cycle times less than 20 ms should use all three cycles (because the shorter the detection time the higher the probability of false detection), while times greater than or equal to the 20 ms function well using only the first two cycles.

There is no perceptible modification of the sound quality during cycle 2. Hence, using two cycles generates a system with no perceptible distortion to the listener. The listener can detect a gap (as in cycle three) and the longer the gap the more perceptible it is.

Normally, even if cycle three is used, it is only reached when a DTMF signal is really present. In that event, the listener would not perceive any gap since gaps can only be heard in outgoing signals and not incoming signals.

The DTMF detector in the system has a minimum required time period where tone must be present in order to function. Sometimes this time period is variable. Standards are frequently provided by telephone companies that specify times of tone duration (on and off between two different DTMF signals). DTMF detectors in the system may operate with time periods substantially less than certain phone company standards. In this invention, "tone detection time period" refers to the time period used in the DTMF detector in the system.

Referring now to FIG. 1, a block diagram of an improved tone detection system and method according to the present invention is illustrated.

In FIG. 1, improved tone detection system 10 is illustrated connected to a standard telephone line 12 through a hybrid circuit 14. Hybrid circuits such as circuit 14 are well known in the art and need not be described in detail other than the purpose of a hybrid is to convert signals between a two-line lead such as lead 12 and a pair of two-wire unidirectional leads such as receive lead 16 and transmit lead 18.

In typical operation, an incoming analog signal on lead 12 is connected through hybrid circuit 14 to receive lead 16 for connection to gain circuit 40 and in turn to automatic level adjust circuit 20. As is known in the art, level adjust circuit 20 is utilized to maintain the same volume level for different callers (e.g., an automatic gain control). This provides for a uniform volume level in conjunction with the tone detection system.

The output of auto level adjust circuit 20 is input via lead 31 to a delta modulator filter 22 which converts the incoming voice signals to a digital format for connection to a serdes (serializer/deserializer) circuit 28. The digitized voice signals are then connected as necessary to an external random access memory (RAM) via lead 30. The stored voice messages from an external RAM are connected through lead 32 through modulator 22, switch 35 and gain adjust circuit 37 to transmit lead 18. The voice signals are then connected through hybrid circuit 14 for connection to telephone line 12.

In typical operation, voice signals are input through telephone line 12 through hybrid circuit 14 to an external RAM, as depicted in FIG. 1, in a known fashion. Similarly, voice signals from an external RAM are connected through lead 32 through the demodulator circuit 22 and output via transmit lead 18, hybrid circuit 14, and telephone line 12 in a known fashion. Consequently, the general overall operation of a voice message switching system need not be described in any further detail as that particular aspect is known in the art and forms no part of the invention herein.

In operation, according to the present invention, a voice message signal is transmitted externally as an outgoing analog voice signal via transmit lead 18, hybrid circuit 14 and telephone line 12. As previously described, with such types of techniques, if a user wishes to gain access to his voice message system, while an analog voice signal is outgoing concurrently, problems can occur in order for the user to obtain access when he utilizes dual tone multi-frequency (DTMF) control signals.

In FIG. 1, when a user wishes to gain access to a system, his incoming voice signal on telephone line 12 is connected to hybrid circuit 14 and receive lead 16 through gain circuit 40 and auto level adjust circuit 20. Gain circuit 40 is also connected to DTMF detector 42. The purpose of DTMF detector 42 is to detect the presence of the dual tone multi-frequency control signals, the detection of which are connected to a microprocessor (not shown) via lead 44.

In FIG. 1, it should be noted that the output of modulator filter 22 also has an input to filter 50 through switch 49. Filter 50 is a combination notch and bandpass filter for the dual purposes to be described.

In a preferred implementation, when DTMF signals are input as an incoming analog voice signal, and those signals are detected by detector 42, the system will switch the output of demodulator filter 22 to the notch filter 50, the purpose of which is to "notch out" or filter any DTMF signal which may be present in the voice message signal being transmitted out to telephone line 12.

In a practical environment, although a voice message signal may not have a true DTMF control capability, nevertheless most voices can eventually falsely trigger a DTMF tone detection system. This event is known as "talk-off," as previously described.

Assuming that an outgoing voice signal is connected to telephone line 12 while at the same time an incoming DTMF signal is coming in on telephone line 12, after a period of approximately 20 milliseconds, the system will switch the outgoing signal to notch filter 50 which will be programmed via microprocessor control to "notch" or filter the DTMF signal which may be present in the outgoing voice signal. The "notched" or "filtered" signals on lead 52 are then connected to transmit lead 18 using switch 35, which utilizes approximately 20 milliseconds in overall operation.

While this filtering or notching is ongoing, the system is still detecting via detector 42 any DTMF control signals on receive lead 16.

If the DTMF control signal is still detected on lead 16, the detection system will "cut off" or disconnect lead 52 from lead 18 for approximately 20 milliseconds. This is used only as an insurance against false detection and is not required. Consequently, a gap in the voice message is formed but which is barely perceptible to a caller, but this provides enough total silence to the tone detection system to determine absolutely whether the original detection was a "talk-off." If this were the case, the detection would stop and normal operations would resume. However, if a caller is trying to gain access to the system, the DTMF detector 42 will continue to be triggered.

In overall operation, the present invention will provide detection capabilities within a time frame of approximately 40 milliseconds with absolute verification in 60 ms. The fastest (shortest) DTMF signal permitted in telephone standards is generally 50 milliseconds which clearly provides an acceptable overall operating time frame.

According to another aspect of the invention, as depicted in FIG. 1, the filter 50 also provides a bandpass capability for situations when the system is receiving control signals and it is desired to detect dial tone, ringback tone or other types of control signals. In such a situation, filter 50 acts as a bandpass filter and the output of filter 50 is connected via lead 54 to energy detect 56, which in turn is connected to the microprocessor (not shown). Energy detector 56 permits a microprocessor to permit call progression monitoring in a simple and economic fashion. The techniques of bandpass filtering and the detection of such types of control signals are known in the art. Filter 50 provides the dual purpose of notching out or filtering out the DTMF control signals in transmitting situation and provides bandpass filtering capabilities in receiving only situations.

Referring now to FIG. 5, a timing diagram illustrating the various events which can cause activation of the improved tone detection system are depicted.

In FIG. 5A, when a signal incoming on lead 12 changes state, a certain time frame passes while DTMF detector 42 of FIG. 1 detects the signal as indicated in FIG. 5A. Depending upon the sensitivity setting of the DTMF detector, via DTMF sensitivity control 60, a detection can occur which is caused by an outgoing signal on transmit line 18, hybrid 14 and telephone line 12.

Assuming that the signal is present as depicted in FIG. 5A, and the signal is detected by detector 42, filter 50 switches states as indicated at time T3 but the signal detected changes state at time T4, as indicated. If this were the case where detection was caused by the outgoing signal and goes away when the filter is switched in, as indicated in time T4, then the system will return to its initial condition.

In FIG. 5B, a situation is depicted in which the signal detected is still present after the 20 millisecond time frame. In such a situation, the next step for the system would be to in effect cut off the output of the notched out or filtered out signal on lead 52 from transmit lead 18.

In typical situations, the "talking-off" could sometimes occur in situations like this such as depicted in FIG. 5B but depending upon the sensitivity setting the system will return to normal operation within 40 milliseconds.

Finally, in FIG. 5C, the situation depicted by an incoming signal which are in effect true DTMF control signals is illustrated. The SIGNAL PRESENT and SIGNAL DETECTED signals illustrated in FIG. 5B will be the same in FIG. 5C, except that those two signals remain active. In FIG. 5C, because the incoming control signals will be detected by DTMF detector 42, and the notched out filter signals will not present any detection problems, it is in fact the typical situation so that the detection will continue and the necessary and desired control signals will be transmitted to microprocessor.

Figure 2:
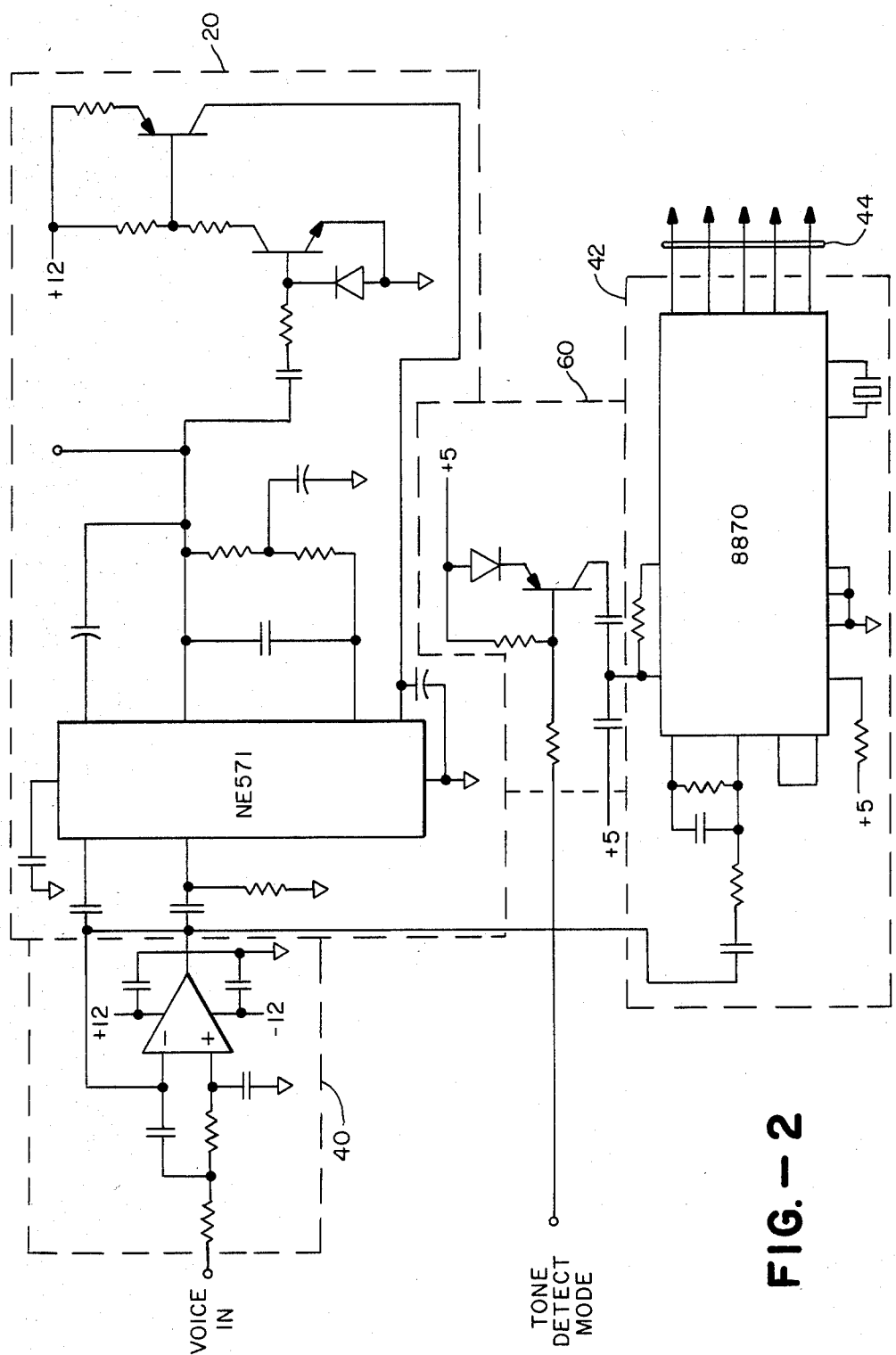
FIG. 2 depicts a schematic diagram of a DTMF decector which forms a portion of FIG. 1.

Referring now to FIG. 2, a schematic diagram of the detector circuit 42, the level adjust circuit 20, sensitivity control 60 and gain circuit 40 of FIG. 1 is depicted. The input to DTMF detector 42 is through gain circuit 40 and it can be seen that the interconnections in FIG. 2 correspond to circuits 40, 42 of FIG. 1. Similarly, level adjust circuit 20 of FIG. 1 can be seen in schematic detail in FIG. 2.

Figure 3:
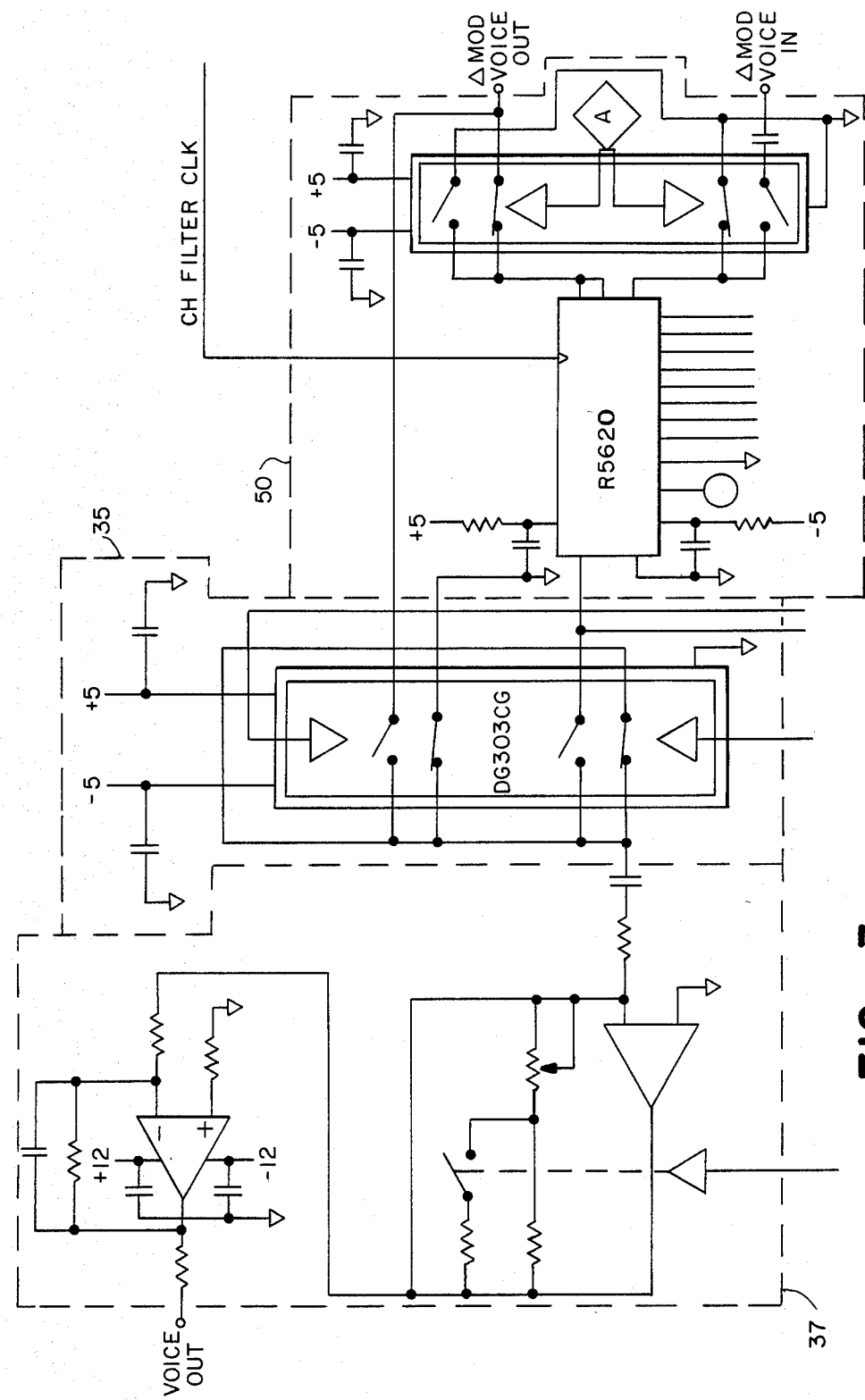
FIG. 3 depicts a schematic diagram of a notch filter which forms a portion of FIG. 1.

Referring now to FIG. 3, the filter and switch circuits of FIG. 1 are depicted in schematic detail. The gain adjust circuit 37, switch 35 and notch/bandpass circuit 50 depicted in FIG. 3 correspond to the same circuits in FIG. 1.

Referring now to FIG. 4, the delta modulator 22-1 and serial/deserializer circuit 22-2 of FIG. 1 are depicted in schematic detail. It can be seen from the schematic representations in FIGS. 2–4 that components of the overall tone detection system are off the shelf components known in the art. However, it is to be understood that the present invention is not claiming the individual components per se, and consequently further details of those schematic drawings of FIGS. 2–4 need not be described.

It can be seen that the present invention has provided an improved tone detection system and method which is believed to be exceedingly high in accuracy when compared to all other tone detection systems described above. The present invention provides an improved system and apparatus to overcome the problems of "talk-off" while providing accurate detection of DTMF control signals which is typically not perceptible to a user. The system detects DTMF tones accurately even while there is a non-standard signal-to-noise ratio on the line.

Accordingly, it is to be understood that the breadth of the present invention should only be limited by the scope of the accompanying claims.

What is claimed is:

1. In a telephone system, tone detection apparatus comprising
   means for connecting an outgoing analog voice signal to a telephone line,
   detect means connected to said telephone line for receiving an incoming analog signal to detect first control signals, and means responsive to said detected signals for filtering second control signals from said outgoing analog signal for a first predetermined period of time, such first predetermined period of time being such as not to effect any human perceptible incoming or outgoing signals.

2. The apparatus as in claim 1 further including means for disconnecting said outgoing signal from said telephone line for a second predetermined period of time if said detect means continue to detect said control signals when said outgoing analog signal is filtered.

3. The apparatus as in claim 2 wherein said control signals are dual tone multi-frequency control signals.

4. The apparatus as in claim 3 further including means for disconnecting said outgoing analog signal from said telephone line and for detecting conventional telephone control signals, said filter means including means for sensing said telephone control signals.

5. In a voice message, store and switching system, tone detect apparatus comprising
 means for connecting an outgoing analog signal including first voice signals to a telephone line,
 detect means connected to said telephone line for receiving an incoming analog signal to detect second voice and dual tone multi-frequency control signals,
 means responsive to said detected signals for filtering said dual tone control signals from said outgoing analog signal for a first predetermined period of time, and
 means for disconnecting said outgoing signal from said telephone line for a second predetermined period of time if said detect means continue to detect said dual tone control signals when said outgoing analog signal is filtered.

6. In a telephone system including tone detection apparatus for detecting dual tone multi-frequency control signals, the method comprising the steps of
 connecting an outgoing analog signal including first voice signals to a telephone line,
 receiving an incoming analog signal to detect second voice and dual tone multi-frequency control signals,
 filtering dual tone multi-frequency signals from said outgoing analog signal for a first predetermined period of time if dual tone control signals are detected in said incoming signal, and
 disconnecting said outgoing signal from said telephone line for a second predetermined period of time if said control signals are continued to be detected when said outgoing analog signal is filtered.

* * * * *